US010794189B2

(12) United States Patent
Chaboud et al.

(10) Patent No.: US 10,794,189 B2
(45) Date of Patent: Oct. 6, 2020

(54) TURBINE ENGINE ASSEMBLY COMPRISING A NOSE CONE AND A FRONT SHROUD

(71) Applicant: SAFRAN AIRCRAFT ENGINES, Paris (FR)

(72) Inventors: Alexis Thomas Chaboud, Moissy-Cramayel (FR); Alexandre Michel Henri Hasquenoph, Moissy-Cramayel (FR); Guillaume Maurice René Patin, Moissy-Cramayel (FR)

(73) Assignee: SAFRAN AIRCRAFT ENGINES, Paris (FR)

(*) Notice: Subject to any disclaimer, the term of this patent is extended or adjusted under 35 U.S.C. 154(b) by 0 days.

(21) Appl. No.: 16/321,263

(22) PCT Filed: Jul. 27, 2017

(86) PCT No.: PCT/FR2017/052111
§ 371 (c)(1),
(2) Date: Jan. 28, 2019

(87) PCT Pub. No.: WO2018/020170
PCT Pub. Date: Feb. 1, 2018

(65) Prior Publication Data
US 2019/0169990 A1 Jun. 6, 2019

(30) Foreign Application Priority Data
Jul. 29, 2016 (FR) ...................... 16 57413

(51) Int. Cl.
*F02C 7/04* (2006.01)
*F01D 5/06* (2006.01)
*F01D 25/24* (2006.01)

(52) U.S. Cl.
CPC ........... *F01D 5/066* (2013.01); *F01D 25/243* (2013.01); *F02C 7/04* (2013.01); *F05D 2220/36* (2013.01);
(Continued)

(58) Field of Classification Search
CPC .......... F02C 7/04; F01D 5/066; F01D 25/243; F01D 25/246
See application file for complete search history.

(56) References Cited

U.S. PATENT DOCUMENTS

| 4,393,650 | A | 7/1983 | Pool | |
| 8,425,197 | B2 * | 4/2013 | Breakwell | F02C 7/04 416/245 R |

(Continued)

OTHER PUBLICATIONS

International Search Report for PCT/FR2017/052111 dated Nov. 3, 2017 [PCT/ISA/210].

*Primary Examiner* — Justin D Seabe
(74) *Attorney, Agent, or Firm* — Sughrue Mion, PLLC

(57) ABSTRACT

The invention relates to an assembly for a turbine engine extending about a longitudinal axis, comprising: a nose cone (20) comprising a conical body (22) extending about the longitudinal axis and a flange (23) comprising a first contact surface (24) forming an extension of an inner surface (25) of the conical body (22); a front shroud (21) comprising an overall annular body (26) extending about the longitudinal axis and a flange (27) comprising a first contact surface (28) forming an extension of an outer surface (29) of the annular body (26), the first contact surface (24) of the nose cone (20) being in contact with the first contact surface (28) of the front shroud (21), the first contact surfaces (24, 28) of the nose cone (20) and the front shroud (21) being tilted in the downstream direction towards the longitudinal axis, so that the flange (23) of the nose cone (20) is secured to the flange (27) of the front shroud (21); and attachment elements (30)

(Continued)

configured to clamp the first contact surface (24) of the flange (23) of the nose cone (20) against the first contact surface (28) of the flange (27) of the front shroud (21).

10 Claims, 4 Drawing Sheets

(52) U.S. Cl.
 CPC .... *F05D 2250/232* (2013.01); *F05D 2260/31* (2013.01); *F05D 2260/36* (2013.01); *Y02T 50/673* (2013.01)

(56) References Cited

U.S. PATENT DOCUMENTS

| | | | |
|---|---|---|---|
| 8,529,204 B2* | 9/2013 | Bagnall | F01D 5/066 415/218.1 |
| 2009/0214354 A1 | 8/2009 | Bagnall | |
| 2010/0051112 A1 | 3/2010 | Dieling | |
| 2010/0215507 A1 | 8/2010 | Breakwell | |

* cited by examiner

TURBINE ENGINE ASSEMBLY COMPRISING A NOSE CONE AND A FRONT SHROUD

CROSS REFERENCE TO RELATED APPLICATIONS

This application is a National Stage of International Application No. PCT/FR2017/052111 filed on Jul. 27, 2017, which claims priority based on French Patent Application No. 1657413 filed on Jul. 29, 2016, the entire contents of each of which are herein incorporated by reference.

GENERAL TECHNICAL FIELD

The present invention relates to a turbine engine assembly comprising a nose cone and a front shroud.

STATE OF THE ART

Turbine engines are known from the state of the art, which extend along a longitudinal axis and which comprise, from upstream to downstream, in the gas flow direction, a fan, one or more compressor stage(s), for example a low-pressure compressor and a high-pressure compressor, a combustion chamber, one or more turbine stages, for example a high-pressure turbine and a low-pressure turbine, and a gas exhaust nozzle. The fan, the low-pressure compressor and the low-pressure turbine are connected to a low-pressure shaft extending along the longitudinal axis. The high-pressure compressor and the high-pressure turbine are connected to a high-pressure shaft arranged about the low-pressure shaft. The low-pressure turbine drives in rotation the low-pressure shaft, while the high-pressure turbine drives in rotation the high-pressure shaft.

Conventionally, such turbine engines further comprise, upstream of the fan, a nose cone which is mounted on the fan by means of a generally annular front shroud itself connected to the low-pressure shaft.

The connection between the nose cone and the front shroud is generally performed by means of bolted joints.

It is, for example, known to mount the nose cone on the front shroud by means of flanges each comprising a contact surface arranged generally perpendicularly to the longitudinal axis of the turbine engine and tightened against each other by means of bolted joints.

However, such a solution is not satisfactory in terms of aerodynamics. Indeed, the bolted joints and, thereby, the housing for accessing said bolted joints are arranged parallel to the longitudinal axis of the turbine engine, so that they disrupt the gas flow.

In order to overcome this problem, it has, for example, been proposed to mount the nose cone on the front shroud by means of flanges each comprising a contact surface substantially parallel with respect to the longitudinal axis of the turbine engine and tightened against each other by means of the bolted joints.

In this way, the bolted joints and, thereby, the housing for accessing said bolted joints are arranged generally radially with respect to the longitudinal axis of the turbine engine. The gas flow is therefore less disturbed.

However, such a solution makes the handling operations of the nose cone difficult. Indeed, during the mounting of the nose cone on the front shroud, tools specifically designed for this purpose must be used in order, on the one hand, to ensure the proper positioning of the nose cone with respect to the front shroud, axially as well as tangentially with respect to the longitudinal axis and, on the other hand, to allow the mounting of the bolted joints to the nose cone and front shroud flanges.

There is therefore required to propose a joint of the nose cone and the front shroud which disturbs in a limited manner the gas flow and which requires, for its implementation, simplified joining operations.

PRESENTATION OF THE INVENTION

The present invention solves this problem by proposing a turbine engine assembly comprising a nose cone and a front shroud mounted together by means of flanges each comprising a contact surface inclined with respect to the longitudinal axis of the turbine engine and tightened against each other by means of fasteners, so as to grip the nose cone on the front shroud.

More specifically, the present invention relates to a turbine engine assembly, comprising:
  a nose cone comprising a conical body extending about the longitudinal axis or an axis parallel to said longitudinal axis and a flange arranged downstream of the conical body, in the gas flow direction, said flange comprising a first contact surface extending into the extension of an inner surface of the conical body,
  a front shroud comprising a generally annular body extending about the longitudinal axis or the axis parallel to said longitudinal axis and a flange arranged upstream of the annular body, in the gas flow direction, said flange comprising a first contact surface extending into the extension of an outer surface of the annular body, the first contact surface of the nose cone being in contact with the first contact surface of the front shroud, and
  fasteners configured to clamp the first contact surface of the nose cone flange against the first contact surface of the front shroud flange.

The first contact surface of the nose cone and the first contact surface of the front shroud are inclined from upstream to downstream, in the gas flow direction, towards the longitudinal axis (the downstream parts of the contact surfaces being consequently closer to the longitudinal axis than the upstream parts), so that the flange of the nose cone grips the flange of the front shroud.

Preferably, the flange of the nose cone and the flange of the front shroud comprise openings arranged correspondingly in said flanges and accommodating the fasteners, said openings extending generally radially with respect to the longitudinal axis and passing through the first contact surfaces of the nose cone and front shroud flanges.

Advantageously, the first contact surfaces of the nose cone flange and of the front shroud flange are inclined with respect to the longitudinal axis by an angle comprised between 5 and 25°.

Advantageously, the flange of the nose cone comprises over its entire circumference, a succession of protrusions extending radially inwards, with respect to the longitudinal axis, from said flange and accommodating the first contact surface of the nose cone flange, and the flange of the front shroud comprises over its entire circumference, a plurality of tabs extending from said flange in the direction of the conical body of the nose cone and accommodating the first contact surface of the front shroud flange.

Advantageously, the flange of the nose cone comprises a second contact surface extending generally perpendicularly with respect to the longitudinal axis into the extension of the first contact surface, and the flange of the front shroud comprises a second contact surface extending generally perpendicularly with respect to the longitudinal axis into the extension of the outer surface of the annular body and into the extension of which the first contact surface extends, the second contact surface of the nose cone being in contact with the second contact surface of the front shroud.

Advantageously, the second contact surfaces of the nose cone flange and of the front shroud flange are continuous over the entire circumference of their respective flange.

Advantageously, the assembly further comprises an annular sealing element arranged between the second contact surface of the nose cone flange and the second contact surface of the front shroud flange.

Advantageously, an annular groove is arranged in the second contact surface of the nose cone flange and/or in the second contact surface of the front shroud flange, said annular groove(s) accommodating the sealing element.

The invention also relates to a nose cone for a turbine engine assembly as previously described.

The nose cone comprises a conical body extending about a longitudinal axis and a flange arranged downstream of the conical body, in the gas flow direction, said flange comprising a first contact surface extending into the extension of an inner surface of the conical body, the first contact surface of the nose cone being intended to be in contact with a first contact surface complementary to a flange of a front shroud, the first contact surface of the nose cone being inclined from upstream to downstream, in the gas flow direction, towards the longitudinal axis. The flange of the nose cone is further configured to receive fasteners so as to clamp the first contact surface of the nose cone flange against the first contact surface of the front shroud flange.

The invention also relates to a front shroud for a turbine engine assembly as previously described.

The front shroud comprises a generally annular body extending about the longitudinal axis and a flange arranged upstream of the annular body, in the gas flow direction, said flange comprising a first contact surface extending into the extension of an outer surface of the annular body, the first contact surface of the front shroud being intended to be in contact with a first contact surface complementary to a flange of a nose cone, the first contact surface of the front shroud being inclined from upstream to downstream, in the gas flow direction, towards the longitudinal axis. The flange of the front shroud is further configured to receive fasteners so as to clamp the first contact surface of the nose cone flange against the first contact surface of the front shroud flange.

The present invention also relates to a turbine engine comprising a turbine engine assembly as previously described.

It also relates to a method for mounting a nose cone of an assembly of the aforementioned type on a front shroud of this assembly, in which the nose cone is advanced along the longitudinal axis and positioned on the front shroud until the first inclined contact surface of the nose cone and the first inclined contact surface of the front shroud are put into contact, the fasteners are placed to clamp the first contact surface of the nose cone flange against the first contact surface of the front shroud flange.

In particular, the nose cone is advanced along the longitudinal axis until the second contact surface of the nose cone flange is in contact with the second contact surface of the front shroud flange, then the nose cone is pivoted about the longitudinal axis until the first contact surfaces of the nose cone and front shroud flanges are put into contact.

the fasteners are then placed for clamping.

PRESENTATION OF THE FIGURES

Other features, aims and advantages of the present invention will become apparent upon reading the following detailed description, and in light of the appended drawings given by way of non-limiting examples and wherein.

DETAILED DESCRIPTION OF THE INVENTION

Figure 1:
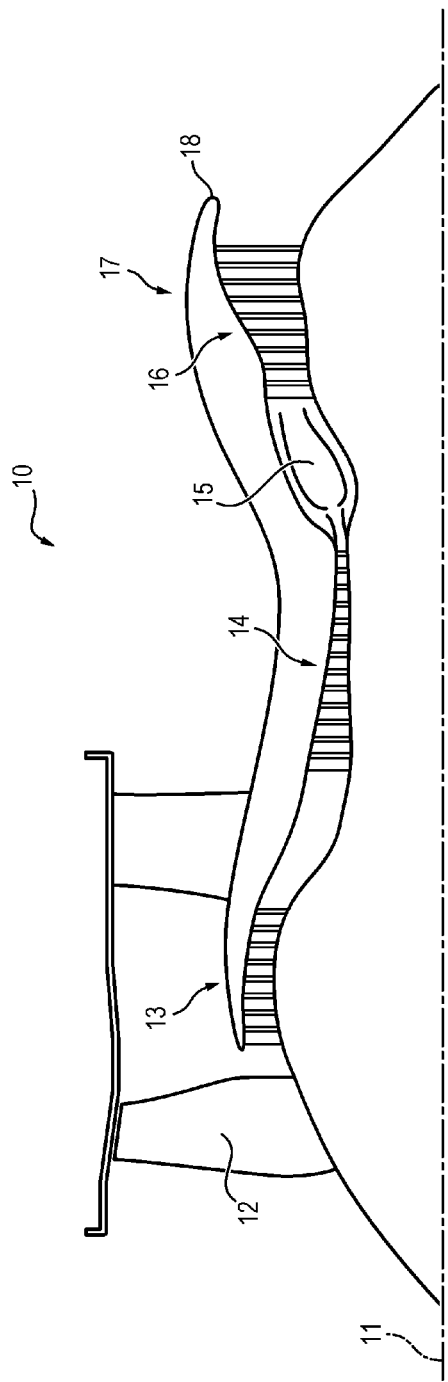
FIG. 1 is a cross-sectional and partial schematic view of a turbine engine according to an embodiment of the invention.

FIG. 1 shows a turbine engine 10 according to an embodiment of the invention. In the following description, the turbine engine 10 is a bypass-type turbine engine. This is however not limiting and the turbine engine can be of another type, such as a turboprop.

The turbine engine 10 extends along a longitudinal axis 11 and comprises from upstream to downstream, in the gas flow direction, a fan 12, one or more compressor stage(s), for example a low-pressure compressor 13 and a high-pressure compressor 14, a combustion chamber 15, one or more turbine stage(s), for example a high-pressure turbine 16 and a low-pressure turbine 17, and a gas exhaust nozzle 18. The fan 12, the low-pressure compressor 13 and the low-pressure turbine 17 are connected to a low-pressure shaft extending along the longitudinal axis. The high-pressure compressor 14 and the high-pressure turbine 16 are connected to a high-pressure shaft arranged about the low-pressure shaft. The low-pressure turbine 17 drives in rotation the low-pressure shaft, while the high-pressure turbine 16 drives in rotation the high-pressure shaft.

Figure 2:
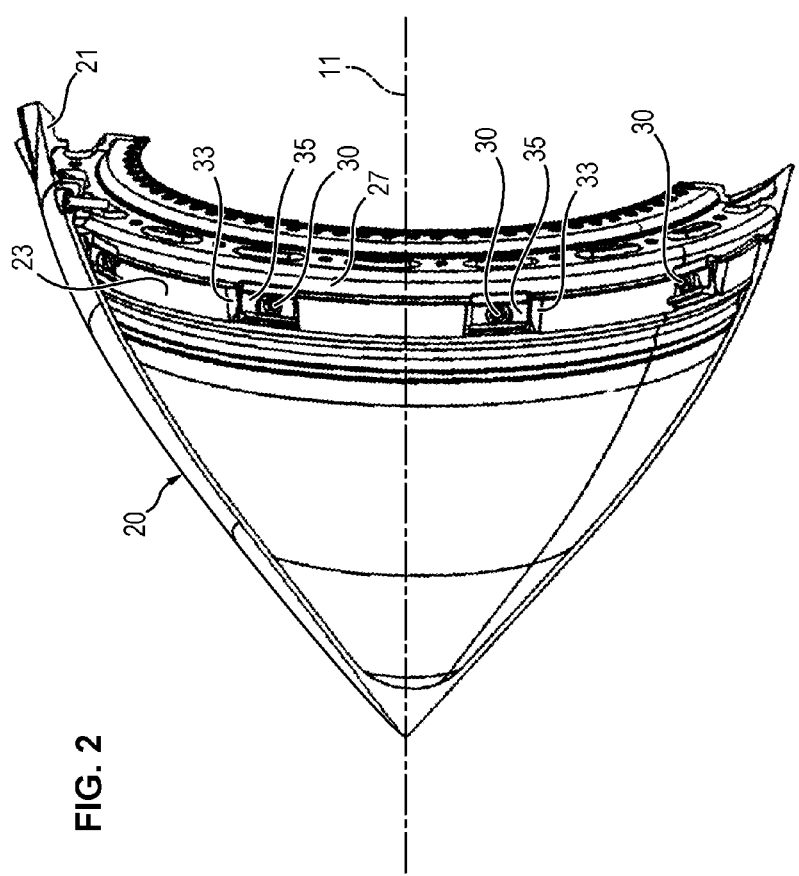
FIG. 2 is a cross-sectional perspective view of the joint between a nose cone and a front shroud of the turbine engine illustrated in FIG. 1.
Figure 3:
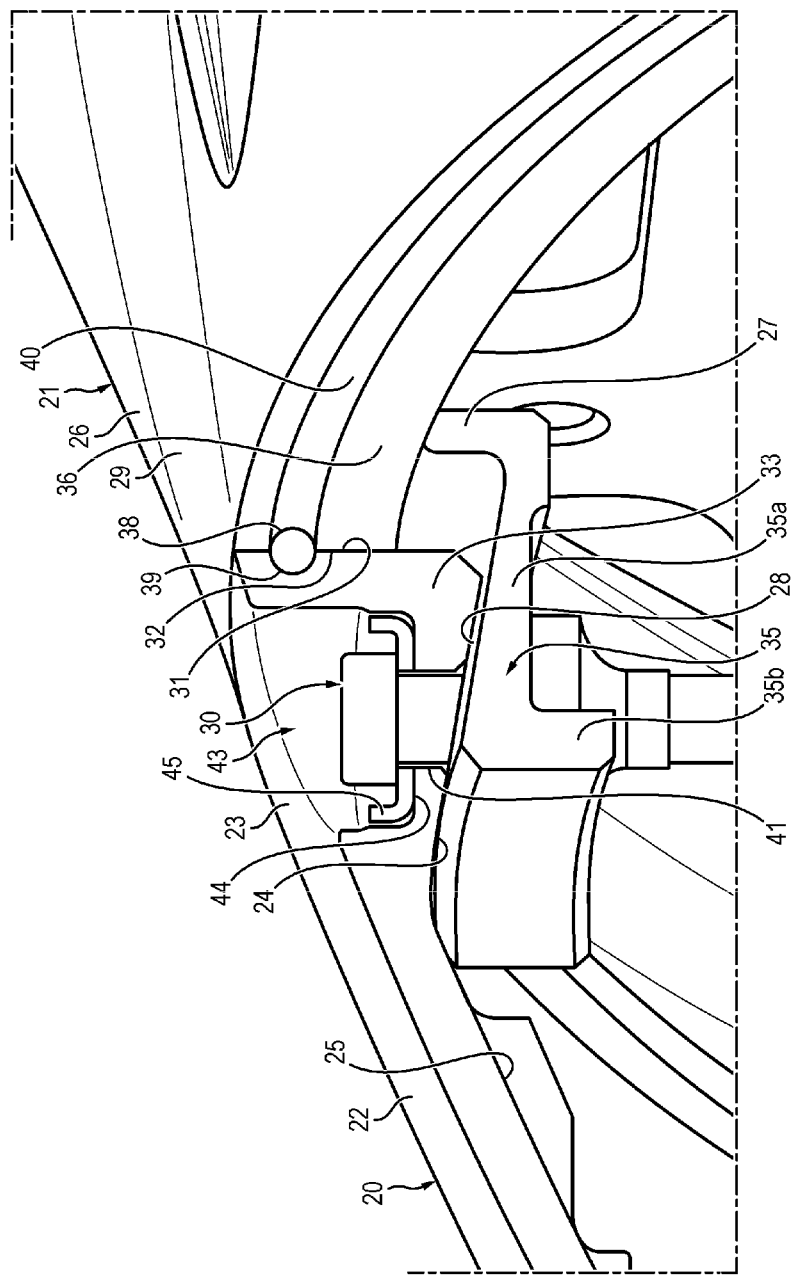
FIG. 3 is a partial perspective view of the joint between the nose cone and the front shroud illustrated in FIG. 2.

The turbine engine 10 further comprises, upstream of the fan 12, a nose cone 20 which is mounted on the fan 12 by means of a front shroud 21 (FIGS. 2 and 3). The front shroud 21 is arranged downstream of the nose cone 20. The front shroud 21 is also connected to the low-pressure shaft.

The nose cone 20 and the front shroud 21 are therefore connected to the rotor, in other words to the rotating parts of the turbine engine 10. The nose cone 20 and the front shroud 21 rotate about the longitudinal axis 11. Alternatively, the nose cone and the front shroud are connected to the stator, in other words to the stationary parts of the turbine engine. The nose cone and the front shroud therefore do not rotate about the longitudinal axis of the turbine engine.

In the following description, «generally radially» or «generally perpendicularly» with respect to an axis means radially or perpendicularly with respect to said axis to the nearest tolerances, that is to say to the nearest 1°.

Figure 4:
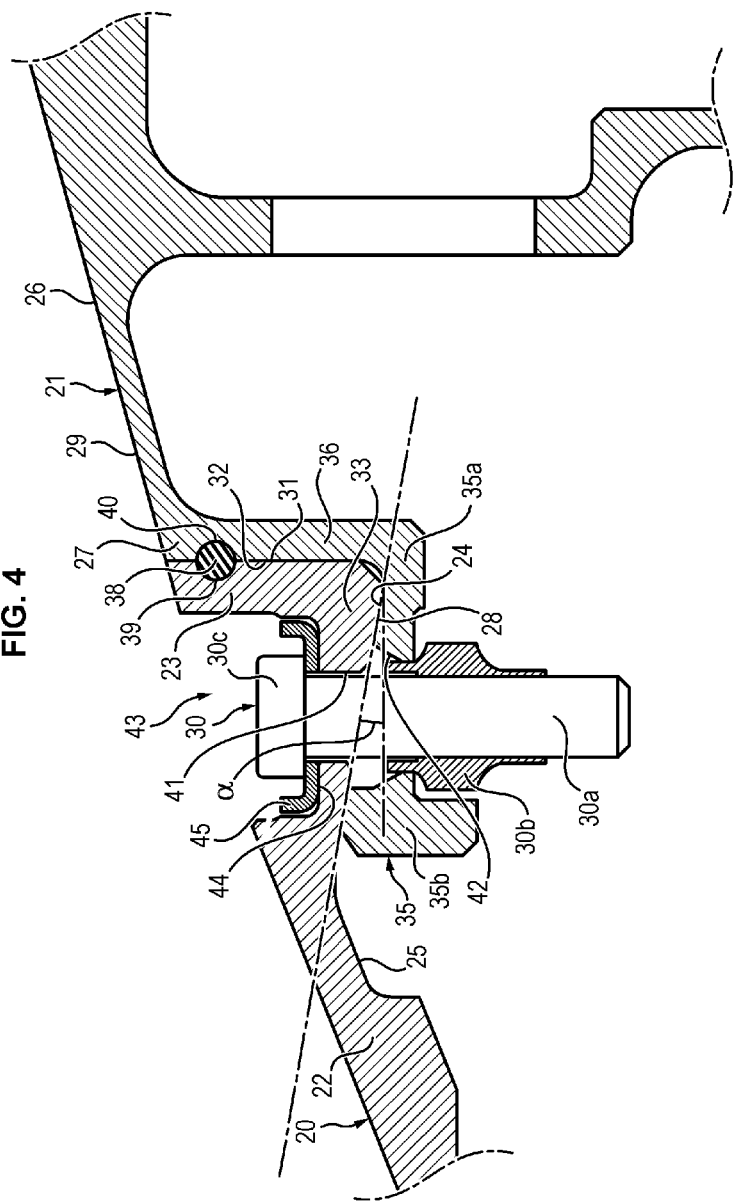
FIG. 4 is a cross-sectional view of the joint illustrated in FIG. 2.

The nose cone 20 and the front shroud 21 are shown in greater detail in FIGS. 2 to 4.

The nose cone 20 comprises a conical body 22 extending about the longitudinal axis 11 and a flange 23 by means of which the nose cone 20 is mounted on the front shroud 21.

The flange 23 of the nose cone 20 is arranged downstream of the conical body 22. The flange of the nose cone 20 comprises a first contact surface 24 with the front shroud 21 which extends into the extension of an inner surface 25 of the conical body 22.

The front shroud 21 comprises a generally annular body 26 extending about the longitudinal axis 11 and a flange 27 mounted on the flange 23 of the nose cone 20. The flange 27 of the front shroud 21 is arranged upstream of the annular body 26 of the front shroud 21. The flange 27 of the front shroud 21 comprises a first contact surface 28 with the nose cone 20 which extends into the extension of an outer surface 29 of the annular body 26.

Alternatively, the conical body 22 of the nose cone 20 and the annular body 26 the front shroud 21 extend about an axis parallel to the longitudinal axis 11.

The first contact surface 24 of the nose cone 20 is in contact with the first contact surface 28 of the front shroud 21.

The turbine engine 10 further comprises fasteners 30 configured to clamp the first contact surface 24 of the nose cone 20 flange 23 against the first contact surface 28 of the front shroud 21 flange 27.

The first contact surface 24 of the nose cone 20 and the first contact surface 28 of the front shroud 21 are inclined from upstream to downstream, in the flow gas direction, towards the longitudinal axis 11. In other words, the first contact surface 24 of the nose cone 20 is inclined, from the conical body 22 of the nose cone 20 to the annular body 26 of the front shroud 21, towards the longitudinal axis 11, while the first contact surface 28 of the front shroud 21 is inclined, from the annular body 26 of the front shroud 21 to the conical body 22 of the nose cone 20, in a direction opposite to the longitudinal axis 11.

Thus, the flange 23 of the nose cone 20 grips the flange 27 of the front shroud 21. Indeed, the inclination of the first contact surfaces 24, 28 of the nose cone 20 and front shroud 21 flanges 23, 27 allows the flange 27 of the front shroud 21 to retain the flange 23 of the nose cone 20 and therefore to maintain at least axially in position the nose cone 20, when placing the fasteners 30 and without the need to use the specific tools. Joining the flange 23 of the nose cone 20 to the flange 27 of the front shroud 21 is therefore easier. The first contact surfaces 24, 28 of the nose cone 20 and front shroud 21 flanges 23, 27 form a centering track of the nose cone 20.

The first contact surfaces 24, 28 of the nose cone 20 flange 23 and of the front shroud 21 flange 27 are, for example, inclined with respect to the longitudinal axis 11 by an angle $\alpha$ comprised between 5 and 25°. Preferably, the angle of inclination $\alpha$ is comprised between 7 and 20°. More preferably, the angle of inclination $\alpha$ is comprised between 10 and 15°.

Preferably, the flange 23 of the nose cone 20 comprises a second contact surface 31 extending generally perpendicularly with respect to the longitudinal axis 11 into the extension of the first contact surface 24, and the flange 27 of the front shroud 21 comprises a second contact surface 32 extending generally perpendicularly with respect to the longitudinal axis 11 into the extension of the outer surface 29 of the annular body 26 and into the extension of which the first contact surface 28 extends. The second contact surface 31 of the nose cone 20 is in contact with the second contact surface 32 of the front shroud 21.

Thus, it is possible to ensure that the nose cone and front shroud 21 flanges 23, 27 are properly engaged with each other. In others words, the second contact surfaces 31, 32 of the nose cone 20 and front shroud 21 flanges 23, 27 allow ensuring operators that the nose cone 20 comes alongside the front shroud 21. Indeed, it is when the second contact surfaces 31, 32 are in contact with each other that the flange 23 of the nose cone 20 is sufficiently engaged in the flange 27 of the front shroud 21. The second contact surfaces 31, 32 of the nose cone 20 and front shroud 21 flanges 23, 27 therefore contribute to maintaining in position the nose cone 20, when placing the fasteners 30. The second contact surfaces 31, 32 of the nose cone 20 and front shroud 21 flanges 23, 27 further allow distributing the stresses in their respective flange 23, 27.

The flange 23 of the nose cone 20 comprises over its entire circumference, a succession of protrusions extending radially inwards, with respect to the longitudinal axis 11, from said flange 23 and accommodating the first contact surface 24. In this way, the first contact surface 24 of the nose cone 20 flange 23 is discontinuous over the circumference of said flange 23. This allows in particular reducing the mass of the nose cone 20.

The flange 23 of the nose cone 20 comprises, for example, nine protrusions 33. The protrusions 33 extend, for example, each on an angle comprised between 5 and 40° about the longitudinal axis 11, preferably between 30 and 40° and more preferably substantially equal to 35°. Preferably, the protrusions 33 are evenly distributed about the longitudinal axis 11.

The flange 23 of the nose cone 20 comprises a downstream end accommodating the second contact surface 31. The second contact surface 31 the nose cone 20 flange 23 is continuous over the entire circumference of said flange 23.

The flange 27 of the front shroud 21 comprises a plurality of connected tabs 35 at the upstream end of the annular body 26 of the front shroud 21 flange 27 by a part 36 extending radially inwardly, with respect to the longitudinal axis 11. Each tab 35 comprises a first portion 35a extending from said flange 27 in the direction of the conical body 22 of the nose cone 20 and accommodating the first contact surface 28. In this way, the first contact surface 28 of the front shroud 21 flange 27 is discontinuous over the circumference of said flange 27. This allows reducing the mass of the front shroud 21. Once assembled, the protrusions 33 of the nose cone 20 flange 23 and the tabs 35 of the front shroud 21 flange 27 are arranged opposite each other. A tab 35 of the front shroud 21 flange 27 is associated with each protrusion 33 of the nose cone 20 flange 23.

The flange 27 of the front shroud 21 comprises for example nine tabs 35. The tabs 35 extend, for example, each over an angle comprised between 5 and 40° about the longitudinal axis 11, preferably between 30 and 40° and still more preferably substantially about 35°. Preferably, the tabs 35 are evenly distributed about the longitudinal axis 11.

The tabs 35 of the front shroud 21 flange 27 can further comprise a second portion 35b extending radially inwards, with respect to the longitudinal axis 11, from the first portion 35a.

The flange 27 of the front shroud 21 may comprise a part 36 extending radially inwards, with respect to the longitudinal axis 11, from the upstream end of the annular body 26 of the front shroud 21. The part 36 of the front shroud 21 flange 27 accommodates the second contact surface 28. The first part 36 of the front shroud 21 flange 27 extends over the entire circumference of said flange 27. In this way, the second contact surface 28 of the front shroud 21 flange 27 is continuous over the entire circumference of said flange 27. The first portion 35a of the tabs of the front shroud 21 flange 27 extends for example from the first part 36, in a direction opposite to the annular body 26 of the front shroud 21.

Thus, in order to engage the flange 23 of the nose cone 20 with the flange 27 of the front shroud 21, it suffices to advance the nose cone 20 along the longitudinal axis 11 so that the protrusions 33 are each positioned in a recess arranged between two adjacent tabs 35, and this until the second contact surface 31 of the nose cone 20 flange 23 is in contact with the second contact surface 32 of the front shroud 21 flange 27, then to pivot the nose cone 20 about the longitudinal axis 11 in order to position the protrusions 33 opposite the tabs 35 and put into contact the first contact surfaces 24, 28 of the nose cone 20 and front shroud 21 flanges 23, 27. The nose cone 20 and the front shroud 21 are then ready for placing the fasteners 30. The mounting of the nose cone 20 with the flange 27 of the front shroud 21 therefore requires little manipulations thereby making it particularly simple The turbine engine 10 may further comprise an annular sealing element 38 arranged between the second contact surface 31 of the nose cone 20 flange 23 and the second contact surface 32 of the front shroud 21 flange 27.

Thus, the joint of the nose cone 20 and of the front shroud 21 is sealed. This allows preventing water from entering the nose cone 20 and the front shroud 21 and therefore limiting moisture inside said nose cone 20 and said front shroud 21.

An annular groove 39, 40 is for example arranged correspondingly in the second contact surface 31 of the nose cone 20 flange 23 and the second contact surface 32 of the front shroud 21 flange 27 to accommodate the sealing element 38. For this, the annular grooves 39, are preferably of a shape complementary to the sealing element 38.

Alternatively, a single annular groove is arranged in the second contact surface 31 of the nose cone 20 flange 23 or in the second contact surface 32 of the front shroud 21 flange 27.

The sealing element 38 has, for example, a circular cross-section and, where appropriate, the annular groove(s) 39, 40 has/have a semicircular cross-section.

Openings 41, 42 are for example arranged correspondingly in the flange 23 of the nose cone 20 and the flange 27 of the front shroud 21 to accommodate the fasteners 30.

The openings 41, 42 extend generally radially with respect to the longitudinal axis 11. The openings 41, 42 pass through the first contact surfaces 24, 28 of the nose cone 20 and front shroud 21 flanges 23, 27. More specifically, the openings 41, 42 are arranged in the flange 23 of the nose cone 20 at the protrusions 33 and in the flange 27 of the front shroud 21 at the tabs 35. A pair of openings 41, 42 in correspondence is, for example, associated with each pair formed by a protrusion 33 of the nose cone 20 flange 23 and a tab 35 of the front shroud 21 flange 27.

The fasteners 30 comprise, for example, a threaded rod 30a and a nut 30b. The threaded rod 30a is preferably provided with a head 30c to form a bolt. The threaded rod 30a is inserted into the openings 41, 42 of the nose cone 20 and front shroud 21 flanges. The nut 30b is, for example, slipped at the end of the threaded rod 30a arranged opposite the tab 35 of the front shroud 21 flange 27.

The openings 41 of the nose cone 20 flange 23 may be, for example in the absence of head 30c, tapped in order to cooperate with the threading of the threaded rods 30a. The openings 42 of the front shroud 21 flange 27 have, for example, a diameter greater than that of the openings 41 of the nose cone 20 flange 23, so that the threaded rods 30a are not in contact with the openings 42 of the front shroud 21 flange 27.

The nuts 30b have, for example, a portion thinned by a shoulder. The thinned portion of the nuts 30b is inserted into the openings 42 of the tabs 35 of the front shroud 21 flange 27 and the shoulder forms an abutment surface in contact with the surface of the tabs 35 opposite to the first contact surface 28 of the front shroud 21 flange 27. The second portion 35b of the tabs 35 is configured to block the nuts 30b in rotation.

The threaded rod 30a is provided with a head 30c. In the presence of a head 30c, the flange 23 of the nose cone 20 comprises, for example, housings 43 leading to the openings 41 of the nose cone 20 flange 23 and accommodating the head 30c of the threaded rod 30a, so that the head 30c of the threaded rod 30a does not disturb the gas flow along the outer surface of the nose cone 20. This also allows compensating the addition of mass produced by the protrusions 33. A clamping surface 44 which is generally parallel to the longitudinal axis 11 is for example arranged at the bottom of the housings 43 in order to accommodate the head 30c of the threaded rod 30a. Cups 45 may further be placed between the clamping surface 44 of the housings 43 of the nose cone 20 flange 23 and the head 30c of the threaded rods 30a, in order to protect the flange 23 of the nose cone 20 from deformations occurring during the clamping of the threaded rods 30a and of the nuts 30b.

The turbine engine 10 described above has the advantage of comprising a nose cone 20 and a front shroud 21 comprising flanges 23, 27 provided with first contact surfaces 24, 28 of complementary shape and inclined with respect to the longitudinal axis 11, so as to allow the hooking of the nose cone 20 flange 23 on the front shroud 21 flange 27 and therefore to facilitate the mounting of the nose cone 20 on the front shroud 21.

The invention claimed is:

1. An assembly for a turbine engine extending about a longitudinal axis, the assembly comprising:
    a nose cone comprising a conical body extending about the longitudinal axis or an axis parallel to the longitudinal axis and a flange arranged downstream of the conical body, in the gas flow direction, the flange comprising a first contact surface extending into the extension of an inner surface of the conical body,
    a front shroud comprising a generally annular body extending about the longitudinal axis or the axis parallel to said longitudinal axis and a flange arranged upstream of the annular body, in the gas flow direction, the flange comprising a first contact surface extending into the extension of an outer surface of the annular body, the first contact surface of the nose cone being in contact with the first contact surface of the front shroud, and
    fasteners configured to clamp the first contact surface of the nose cone flange against the first contact surface of the front shroud flange,
    wherein the first contact surface of the nose cone and the first contact surface of the front shroud are inclined from upstream to downstream, in the gas flow direction, towards the longitudinal axis, so that the flange of the nose cone grips the flange of the front shroud, even when the fasteners are not yet positioned.

2. The assembly according to claim 1, wherein the first contact surfaces of the nose cone flange and of the front shroud flange are inclined with respect to the longitudinal axis by an angle comprised between 5 and 25°.

3. The assembly according to claim 1, wherein the flange of the nose cone comprises over its entire circumference, a succession of protrusions extending radially inwards, with respect to the longitudinal axis, from said flange and accommodating the first contact surface of the nose cone flange, and wherein the flange of the front shroud comprises over its entire circumference, a plurality of tabs extending from said flange in the direction of the conical body of the nose cone and accommodating the first contact surface of the front shroud flange.

4. The assembly according to claim 1, wherein the flange of the nose cone comprises a second contact surface extending generally perpendicularly with respect to the longitudinal axis into the extension of the first contact surface, and wherein the flange of the front shroud comprises a second contact surface extending generally perpendicularly with respect to the longitudinal axis into the extension of the outer surface of the annular body and into the extension of which the first contact surface extends, the second contact surface of the nose cone being in contact with the second contact surface the front shroud.

5. The assembly according to claim 4, wherein the second contact surfaces of the nose cone flange and of the front shroud flange are continuous over the entire circumference of their respective flange.

6. The assembly according to claim 4, further comprising an annular sealing element arranged between the second contact surface of the nose cone flange and the second contact surface of the front shroud flange.

7. The assembly according to claim 6, wherein an annular groove is arranged in the second contact surface of the nose cone flange and/or in the second contact surface of the front shroud flange, said annular groove(s) accommodating the sealing element.

8. A turbine engine comprising a turbine engine assembly according to claim 1.

9. An assembly for a turbine engine extending about a longitudinal axis, the assembly comprising:
a nose cone comprising a conical body extending about the longitudinal axis or an axis parallel to the longitudinal axis and a flange arranged downstream of the conical body, in the gas flow direction, the flange comprising a first contact surface extending into the extension of an inner surface of the conical body,
a front shroud comprising a generally annular body extending about the longitudinal axis or the axis parallel to said longitudinal axis and a flange arranged upstream of the annular body, in the gas flow direction, the flange comprising a first contact surface extending into the extension of an outer surface of the annular body, the first contact surface of the nose cone being in contact with the first contact surface of the front shroud, and
fasteners configured to clamp the first contact surface of the nose cone flange against the first contact surface of the front shroud flange,
wherein the first contact surface of the nose cone and the first contact surface of the front shroud are inclined from upstream to downstream, in the gas flow direction, towards the longitudinal axis, so that the flange of the nose cone grips the flange of the front shroud, and
wherein the first contact surfaces of the nose cone flange and of the front shroud flange are inclined with respect to the longitudinal axis by an angle comprised between 5 and 25°.

10. A method for mounting a nose cone on a front shroud of an assembly including:
the nose cone comprising a conical body extending about the longitudinal axis or an axis parallel to the longitudinal axis and a flange arranged downstream of the conical body, in the gas flow direction, the flange comprising a first contact surface extending into the extension of an inner surface of the conical body,
the front shroud comprising a generally annular body extending about the longitudinal axis or the axis parallel to said longitudinal axis and a flange arranged upstream of the annular body, in the gas flow direction, the flange comprising a first contact surface extending into the extension of an outer surface of the annular body, the first contact surface of the nose cone being in contact with the first contact surface of the front shroud, and
fasteners configured to clamp the first contact surface of the nose cone flange against the first contact surface of the front shroud flange,
wherein the first contact surface of the nose cone and the first contact surface of the front shroud are inclined from upstream to downstream, in the gas flow direction, towards the longitudinal axis, so that the flange of the nose cone grips the flange of the front shroud, even when the fasteners are not yet positioned,
the method comprising:
advancing the nose cone along the longitudinal axis so that protrusions are each positioned in a recess arranged between two adjacent tabs until a second contact surface of the nose cone flange is in contact with a second contact surface of the front shroud flange,
pivoting the nose cone about the longitudinal axis to put into contact the first inclined contact surfaces of the nose cone and front shroud flanges, and
placing the fasteners.

* * * * *